Patented Dec. 27, 1927.

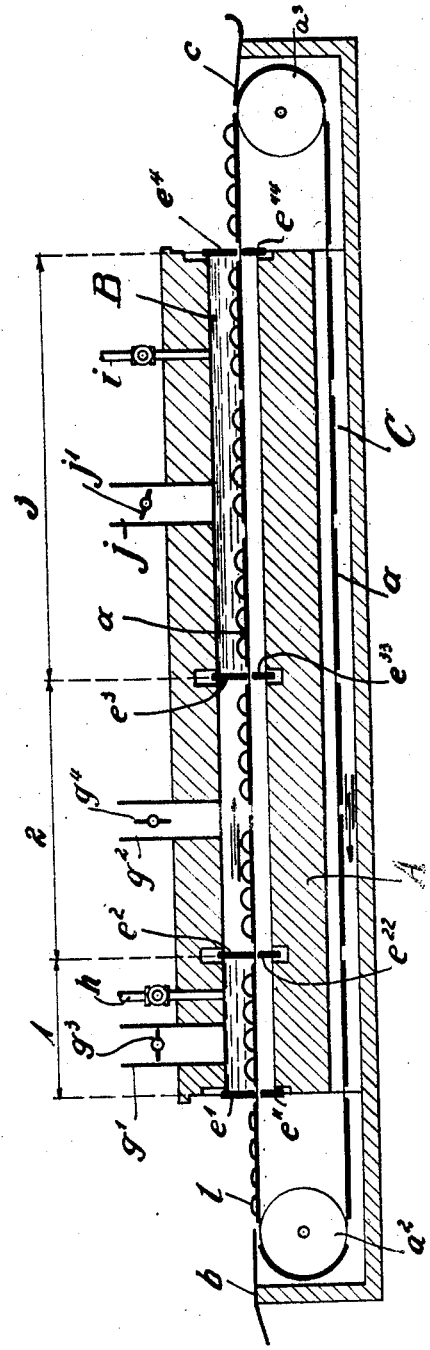

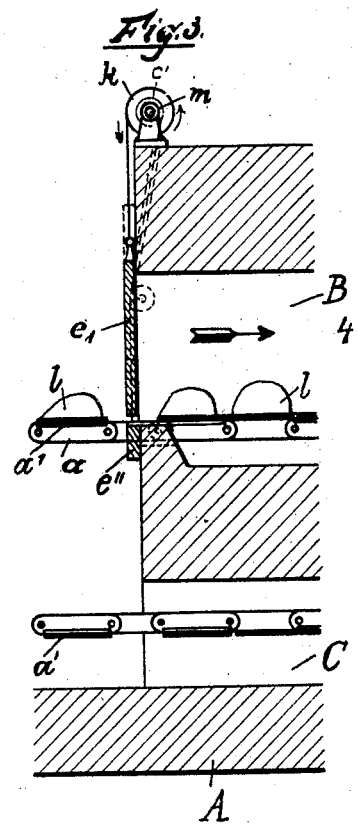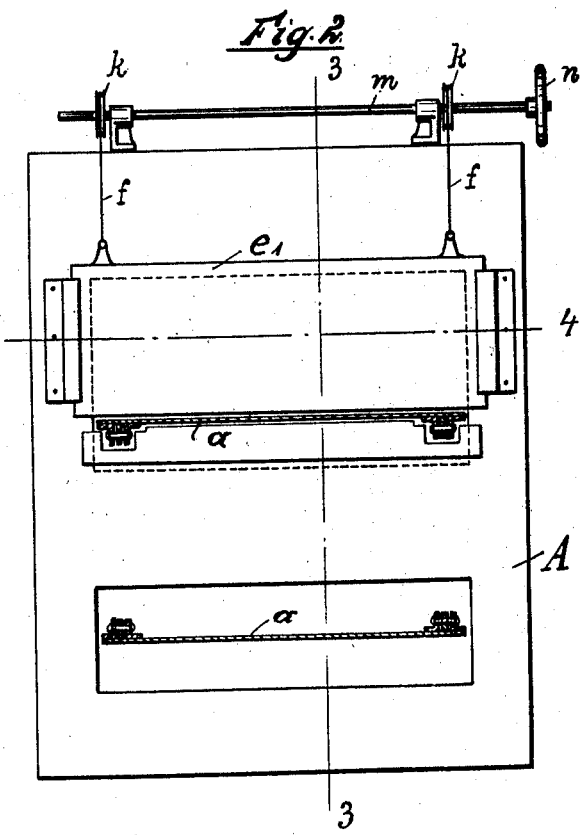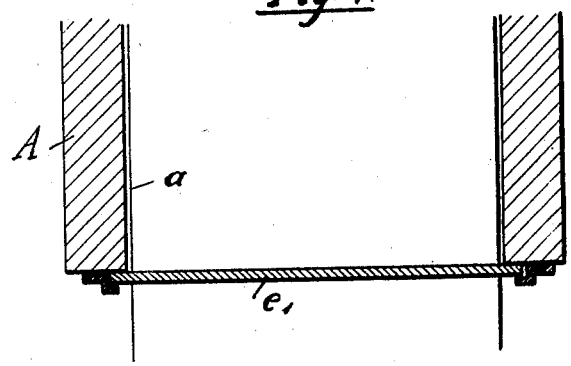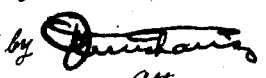

1,653,774

UNITED STATES PATENT OFFICE.

FRIEDRICH KÜHTZ, OF CANNSTATT, GERMANY.

BAKING OVEN.

Application filed April 29, 1925, Serial No. 26,790, and in Germany April 5, 1922.

My invention relates to baking ovens and more especially to baking ovens for so-called continuous operation in which the dough or the like is successively and intermittently conveyed through a plurality of chambers being for instance subjected to the action of steam in the first chamber of dry heated air in the second and to the action of air saturated with moisture from the bread in the third chamber.

Such ovens have already been provided with an endless conveyer carrying transversely extending laths on which the loaves of bread or the like are carried. It is an object of my invention to improve this type of baking oven by arranging the laths on the conveyer in sets the length of which is in proportion to the length of the chambers through which the goods move in succession. To this end I space the sets such a distance apart that the dampers or partitions which separate the several chambers can be lowered onto the conveyer between the sets of laths. It will be understood that the length of a chamber must at least be equal to the length of one set of laths but may be any multiple thereof the condition being that each partition or damper register with an interstice between the sets during the periods when the conveyer is not in motion.

In the drawings affixed to this specification and forming part thereof a device embodying my invention is illustrated diagrammatically by way of example. In the drawings Fig. 1 is a longitudinal section of a baking oven equipped with a conveyer according to this invention.

Fig. 2 is a front end elevation of the oven, showing the conveyer in cross section;

Fig. 3 is a section on the line 3—3 in Fig. 2, and

Fig. 4 is a sectional plan view on the line 4—4 in Fig. 2.

Referring to the drawings A is the brickwork of the oven, and B is the row of baking chambers in the oven through which the endless conveyer $a$ is moved intermittently by suitable mechanism (not shown). The oven is closed at both ends by dampers $e'$ and $e^4$ and subdivided into chambers 1, 2 and 3 by intermediate dampers $e^2$ and $e^3$ which may be controlled by suitable means for instance chains $f$ and pulleys $k$ on a shaft $m$ which is rotated by a hand wheel $n$.

Sills $e''$, $e^{22}$, $e^{33}$ and $e^{44}$ are arranged below the conveyer $a$ opposite each damper. If desired the sills may be constructed as additional dampers which are raised when the mating dampers are lowered so as to obtain a tighter closure. As illustrated in Fig. 3, the sill $e''$ is connected with a small pulley $c'$ on the shaft of the pulley $k$ and a cable or the like is secured to the sill $e''$ as indicated in dotted lines so that upon rotation of the pulley $c$ the damper $e'$ and the sill $e''$ will move in opposite directions and constitute a pair of cooperating dampers.

The conveyer $a$ is supported on pulleys and formed of pairs of links.

Each pair of links supports a lath $a'$ on which the loaves of dough $l$ are placed. The laths $a'$ are arranged in sets of four; the pairs of links at both ends of the sets do not carry laths so that at this point a damper can be lowered on its sill or the sill raised between two adjoining sets of laths as shown for the front damper $e'$ in Fig. 3. The conveyer is moved through the passage B in the direction of the arrow in Fig. 3 and returns through a passage C in the foundation of the oven. Instead of being horizontal the conveyer may be also inclined so as to obtain a more effective action of the steam. The loaves of dough are placed on the belt at $b$ and may be removed in finished condition at $c$.

The loaves are steamed in the first chamber 1 the length of which is equal to that of one set of laths $a'$. Steam is admitted through a pipe $h$ and exhausted through a pipe $g'$. The length of the second chamber 2 is equal to twice the length of a set of laths and the chamber is provided with a pipe $g^2$ for abducting the vapors and the length of the third chamber 3 is equal to three times the length of a set. This chamber is provided with a vapor discharge pipe $j$ and a steam pipe $i$. Obviously any number of chambers and any means for supplying them with steam and discharging vapors from them may be provided and flaps may be arranged in the discharge pipes as indicated at $g^3$, $g^4$ and $j'$.

The operation of this oven is as follows:—

At $b$ a set of laths $a'$ is charged with loaves of dough $l$, in the present instance four. All the dampers are opened so as to clear the loaves. The conveyer $a$ is moved forward the length of one set of laths and the dampers are lowered onto their sills in the interstices of the sets. The four loaves are now in the first or steaming chamber 1 and one set of four loaves has been moved into the next chamber or in the case of the chamber 3 into the open air.

It will be understood that any number of dampers may be provided and that according to the character of the charge all or some of the dampers may be operated periodically or the dampers may remain open during the full period of operation in which case instead of being moved intermittently the conveyer is moved continuously.

I wish it to be understood that I do not desire to be limited to the exact details of construction shown and described, for obvious modifications will occur to a person skilled in the art.

I claim:—

In combination, a baking oven comprising pairs of upper and lower dampers, the dampers of each pair being movable in opposite directions, an endless conveyor extending across said oven between said upper and lower dampers and laths on said conveyor arranged in sets, the length of a set being slightly inferior to the distance between two adjoining pairs of dampers.

In testimony whereof I affix my signature.

FRIEDRICH KÜHTZ